Patented Apr. 14, 1953

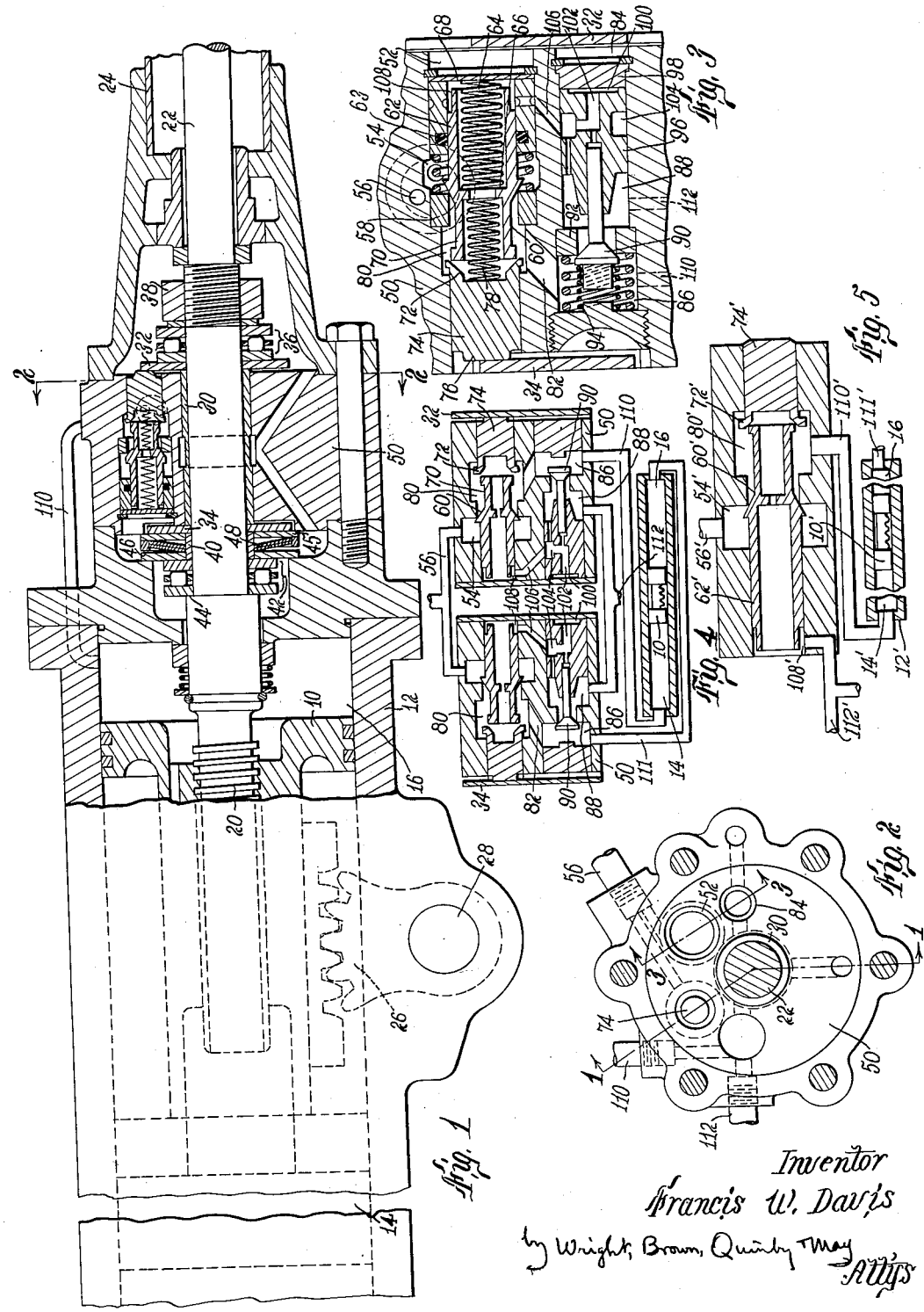

2,634,708

UNITED STATES PATENT OFFICE 2,634,708

POWER BOOSTER MECHANISM WITH POPPET VALVE CONTROLS FOR AUTOMOTIVE STEERING GEARS

Francis W. Davis, Belmont, Mass.

Application September 24, 1948, Serial No. 51,057

6 Claims. (Cl. 121—41)

This invention relates to improvements in control valves in a servo-motor or power boosting apparatus suitable for automobile steering gears and other equivalent mechanisms.

It is an object of the invention to provide effective control valves for use in a fluid pressure system which includes a pressure accumulator, that is, a closed container or reservoir in which a substantially constant maximum pressure is maintained. In such a system, means are provided for automatically restoring the fluid pressure in the reservoir to its prescribed maximum whenever the drawing of fluid from the reservoir lowers the pressure therein. In such a system, it is evident that control valves should be tight since a leaky valve tends to reduce pressure in the reservoir and thus requires the expenditure of energy to keep the pressure up, this energy being wasted. It is also desirable that the control valves for a mechanism such as an automobile steering gear booster be sensitive and quick-acting. According to the present invention, control valve structures are provided which not only meet these requirements but are made of parts which can be easily and economically manufactured and assembled.

In a power-operated steering gear for automotive vehicles, such, for example, as that described and illustrated in Patent No. 2,410,049, granted to me October 29, 1946, the fluid motor employed is a piston slidable in a cylinder, the power being supplied by introducing fluid under pressure into one end or the other of the cylinder to push the piston in the desired direction and thus to deflect the vehicle wheels to which the piston is operatively connected. The valves which control the admission of pressure fluid into the cylinder are actuated by movements of a member in either direction from a neutral intermediate position, this member being mechanically connected to the piston to be moved thereby. Pre-loaded spring means are employed to keep this member in its neutral position unless and until the resistance of the steered part of the steering effort is sufficient to overcome the force of the centering springs. When such resistance is encountered, the movable control member is moved in one direction or the other, this resulting in the operation of the corresponding control valve to admit pressure fluid into one of the chambers in the motor. This moves the piston and restores the control member to its neutral position.

In terms of operation of a vehicle, this structure means that the steering gear operates like an ordinary manual steering gear until a road resistance to steering deflection is encountered which is of sufficient magnitude to overcome the pre-load of the spring-centering means, whereupon fluid power at once comes into play to augment the steering effort of the operator. As long as the steering effort does not exceed the pre-load of the spring-centering means, the operator gets the feel of small road reactions, and the vehicle wheels are self-righting when coming out of a turn. During such operation, it is necessary that there be a free flow of fluid between the chambers at opposite ends of the piston in the cylinder so that there shall be no trapping of fluid in either of the chambers which would block or retard the free movement of the piston by operation of the steering wheel.

According to the present invention, control valves of the poppet type are employed, since valves of this type can be made to press tightly on their valve seats and thus practically eliminate leakage. Provision, however, is made for a free flow of fluid between the chambers of the motor as long as the power fluid is not being employed, such free communication being automatically cut off whenever the control valves are operated to admit power fluid into either of the motor chambers. Furthermore, in order to prevent loss of power through the escape of pressure fluid, it is important that the channel of free communication between the motor chambers be cut off before a control valve for the pressure fluid is opened.

It is usually desirable that servo-motors have a quick and sensitive response to small movements. This means that the control valves must operate adequately in response to small movements. This presents no problem where power fluid is supplied under high pressure, but for valves which control communication between the motor chambers, it may be desirable to employ a valve relay or equivalent device to open up a passage of relatively large flow capacity in response to a relatively small movement of the valve-actuating member.

For a more complete understanding of the invention, reference may be had to the following description thereof and to the drawing, of which Figure 1 is a side elevation of a booster mechanism somewhat similar to that shown in my Patent No. 2,410,049, but including an embodiment of the present invention, a portion being broken away to show in section on the line 1—1 of Figure 2;

Figure 2 is a sectional view on the line 2—2 of Figure 1;

Figure 3 is a sectional view on the line 3—3 of Figure 2;

Figure 4 is a diagrammatic showing of the motor and control valves, omitting the springs; and Figure 5 is a diagrammatic showing of a modified form of the invention.

In connection with control apparatus embodying the present invention, it is to be understood that the motor itself and the valve-actuating apparatus can be constructed and arranged differently from the structures shown on the drawing.

The motor illustrated comprises a piston 10 slidable in a cylinder which is part of the housing 12 of the steering gear. The piston is actuated by power fluid admitted under pressure to respective chambers 14 and 16 within the ends of the cylinder. The piston has a screw-threaded axial bore within which is rotatable a screw 20. This screw is coaxial with and may be a part of a steering shaft 22 which projects up through a steering column 24 to the usual steering wheel (not shown). The piston 10 is mechanically connected by a rack and gear connection 26 to a shaft 28, the latter being connected to the deflectable vehicle wheels by customary linkage (not shown). The steering shaft 22 is axially movable for a slight distance sufficient for the actuation of the control valves, hereinafter described, which regulate the admission of power fluid to the chambers 14 and 16.

Mounted on the shaft 22 is a valve actuating member comprising a sleeve 30, and a pair of washers 32 and 34 secured against the ends of the sleeve, axial movements of which operate the control valves as hereinafter described. The washer 32 is axially confined between an end of the sleeve 30 and a roller bearing assembly 36, the latter being supported by a nut 38 on the steering shaft. The washer 34 is backed by a short sleeve 40 which bears against a roller bearing assembly 42, this assembly being backed by a shoulder 44 on the shaft 22. On the sleeve 40 are two washers 45 and 46 between which is a partly compressed Belleville spring washer 48 pressing the washer 45 against the washer 34 and a part of the valve body 50. The Belleville washer also presses the washer 46 against the bearing assembly 42 and also against part of the fixed housing 12. Hence, any axial movement of the shaft 22 in either direction relative to the housing 12 causes either the washer 45 or the washer 46 to move away from contact with the valve body 50 or the housing 12 respectively and thus causes further compression of the Belleville washer 48, thus additionally tending to restore the shaft 22 to its normal axial position relative to the housing 12.

Surrounding the sleeve 30 is the valve body 50 which is secured to the fixed casing 12. The member 50 is provided with four bores therethrough parallel to the axis of the steering shaft. Two of these bores contain control valve mechanism for controlling the flow of pressure fluid to one of the chambers 14 or 16; the other two bores contain valve mechanism to control the admission of power fluid to the other chamber. Since the valve structure in one pair of bores is substantially identical to that in the other pair, a description of one will suffice for both.

As indicated in the diagrammatic showing in Figure 4, the valve structure in one pair of bores extends in the opposite direction to the valve structure in the other pair of bores.

As indicated in Figure 3, the member 50 has a bore 52 therein which varies in diameter, as shown, to form the valve chambers. The inlet chamber 54 is connected to a supply pipe 56 which extends to a pressure accumulator (not shown), so that ordinarily a supply of liquid under substantial, constant pressure is maintained in the valve inlet chamber 54. In the chamber 54 is a valve seat 58 on which is seated a valve 60 of the poppet type. The valve is provided with a hollow valve stem 62 having an exterior diameter substantially equal to the diameter of the valve 60 where it engages the seat 58 so that the valve is pressure-balanced. Leakage along the valve stem 62 is prevented by suitable packing surrounding the stem, preferably a rubber O ring 63 which is inserted in an annular groove in the wall within which the valve stem slides. The pressure fluid which leaks from the chamber 54 along the valve stem as far as the ring 63 presses against the ring and causes it to bear tightly against the valve stem and the bottom of the groove, thus making an effectual seal preventing further progress of the fluid along the valve stem but without preventing sliding movement of the valve stem. In actual construction, additional O rings are used at other points, but the ring 63 only is shown, by way of example, to avoid confusion of detail in the drawings.

A spring 64 within the valve stem 62 presses the valve yieldingly against its seat, the spring 64 being compressed between an inner circumferential rib 66 within the valve element and a fixed disk 68. The valve element has a hollow extension 70 coaxial with the valve stem 62, the interior of the extension 70 and the stem 62 furnishing a continuous passage through the valve element. The end of the extension 70 serves as a valve seat cooperating with a secondary valve 72 on the end of a plunger 74 slidably fitted in a reduced portion of the bore 52. The plunger 74 has a projecting end portion 76 which is pressed against the washer 34 by a spring 78 within the extension 70 so that a slight axial movement of the washer 34 moves the plunger 74 to seat the valve 72 and thus to close the passageway within the extension 70 from a valve outlet chamber 80 which surrounds the extension 70 and is normally cut off from the chamber 54 by the valve 60.

The outlet chamber 80 is connected by a passageway 82 within the member 50 leading to a chamber in the bore 84 which is associated with the bore 52. The portion of the bore 84 with which the passageway 82 communicates, has a chamber 86 separated from a discharge chamber 88 by a poppet valve 90 seated on a valve seat 92 within the bore 84. A spring 94 presses the valve yieldingly against its seat. The valve 90 is operable by a plunger 96 which is slidably fitted in the bore 84. Movements of the plunger 96 away from the valve 90 are limited by a stop member 98 secured in the bore 84 as indicated in Figure 3. A shallow depression in the further end of the plunger 96 provides a chamber 100 having an area almost as large as the end area of the plunger, this chamber being connected, as by a passage 102, to a peripheral chamber 104 in the plunger 96. The chamber 104 is connected by a passage 106 to a chamber 108 into which the hollow valve stem opens.

From the chamber 86 a passage 110 leads to one of the chambers 14 or 16 of the motor. The chamber 88 communicates with a passage 112 leading to a sump from which fluid is drawn to replenish the supply in the pressure accumulator.

This arrangement of valve elements, chambers, and passages is duplicated in the other two bores in the member 50 and controls the flow of pressure fluid to the other motor chamber.

The operation of the control valve structure can best be observed in Figure 4.

Rotation of the steering shaft 22 and its threaded extension 20 tends to move the piston 10 axially in one direction or the other so as to deflect the vehicle wheels which are connected thereto. When the resistance to steering effort is sufficient to overcome the pressure of the Belleville washer 48 so as to cause axial movement of the steering shaft, such movement results in an equal axial movement of the valve actuating member which includes the washers 32 and 34. One of these washers, e. g., the washer 32, moves its plunger 74 ahead of it. This results in the valve 72 engaging its seat on the end of the valve extension 70, thus cutting off the chambers 108 and 100 from the motor chamber 16, this having the effect of cutting off communication between the chamber 14 and the sump 112.

The clearance between the valve 72 and its seat is very small so that a very slight movement of the plunger 74 is sufficient to close this valve. Further movement of the plunger 74 moves the valve 60 from its seat, thus admitting liquid under pressure from the supply pipe 56 into the chamber 80 and thence into the motor chamber 14. This results in a movement of the piston 10 toward the right. Such movement requires the discharge of liquid from the chamber 16. This takes place through the other set of control valves which are associated with the chamber 16.

Liquid being discharged from either motor chamber flows initially through the duct 110 or 111 into the corresponding chamber 86, through the connecting duct 82, the chamber 80, the hollow valve member, the chamber 108, the passage 106, the chamber 104 and the passage 102 into the chamber 100. Sufficient pressure in the chamber 100 is built up to move the plunger 96 so as to move the valve 90 from its seat. This provides an ample passage for the escape of liquid from the chamber 86 directly into the chamber 88 and thence through the passage 112 to the sump.

When the Belleville washer 48 is permitted to restore the steering shaft to its central axial position, the washer 32 moves back to the position shown in Figure 4, thus permitting the springs 64 and 78 to close the valve 60 and to open the valve 72.

When the valve structure is in the neutral position shown in Figure 4, manual steering of the vehicle is possible since the resistance to steering effort is not sufficient to overcome the initial pressure of the Belleville washer 48. For such steering, it is obvious that the liquid in the motor chambers 14 and 16 must be free to flow without hindrance between the chambers. As can be seen from Figure 4, when the rotation of the steering shaft moves the piston 10 toward the right, some of the liquid in the chamber 16 must be pushed out. This expelled liquid passes through the pipe 111 into into the chamber 86 and around through the interior of the valve member 60 to the chamber 100, wherein it builds up pressure to unseat the valve 90 so as to permit direct flow into the duct 112 which leads to the sump, as hereinbefore described. At the same time, the liquid must be supplied to the motor chamber 14. Such liquid comes in directly from the sump since the valve 90 nearest to the chamber 14 is readily opened by the reduction of pressure in the chamber 14 and, hence, in the adjacent chamber 86.

In some types of installation, it will not be necessary to provide for a rapid discharge of liquid from the motor chambers. In such cases, the valve 90 can be dispensed with and a simplified valve structure can be employed, such as is diagrammatically illustrated in Figure 5. The parts shown therein may be identical in structure with corresponding parts shown in Figures 3 and 4. In the simplified form, the motor chamber 16' communicates through a duct 111' directly with the valve chamber 80'. The sump communicates through a duct 112' with the chamber 108' and hence with the interior of the valve stem 62'. During manual steering, therefore, there is free communication between the motor chambers past the valve 72'. When the pressure fluid is called into play, the valve 72' closes, cutting off the chamber 80' from the sump. Thereupon the valve 60' opens, admitting pressure fluid from the supply line 56' to the chamber 80' and thence to the motor chamber 16'.

I claim:

1. In a fluid power system which includes a motor having a piston and opposed pressure chambers, a supply of fluid under pressure, and a sump; control means comprising a member having a valve chamber therein with an inlet portion and an outlet portion, a valve seat in said chamber between said inlet and outlet portions, a valve of the poppet type on said seat, an inlet duct connecting the inlet portion of the chamber with the supply of fluid, an outlet duct connecting said outlet portion of the valve chamber with one of the pressure chambers in the motor, a branch duct from said outlet duct to said sump, a check valve in said branch duct arranged to open when pressure in the branch duct exceeds that in the outlet duct, means normally in communication with said outlet duct and responsive to pressure therein to open said check valve, and an operating element in said member movable to cut off communication between said outlet duct and said check valve opening means and thereafter to move said poppet valve from its seat in the valve chamber.

2. In a follow-up mechanism which includes a supply of fluid under pressure, a sump and a servomotor with a piston and opposed pressure chambers on opposite sides of the piston, control means comprising two members capable of limited relative movement, one of said members having two valve chambers therein, each valve chamber having an inlet portion communicating with said fluid supply, an outlet portion communicating with a corresponding pressure chamber in the motor and a valve seat between the two said portions, a valve of the poppet type on each said seat, each said valve having a hollow stem with a duct therethrough, connecting passages from the sump to said pressure chambers, a check valve in each said passage arranged to permit free passage of fluid from the sump to either pressure chamber, means responsive to pressure in said valve duct to lift the corresponding check valve to permit flow from the corresponding pressure chamber to the sump, and means responsive to relative movement between said members in either direction to close the corresponding valve duct and thereafter to open the valve.

3. In an automotive vehicle steering mechanism of the type having a rotatable steering shaft which is also capable of a limited axial movement, a liquid pressure motor having a reciprocable piston, and means including a screw thread operatively connecting said shaft and piston whereby rotation of the shaft is normally accompanied by corresponding movement of the piston, or movement of the piston without a corresponding rotation of the shaft, results in an axial movement of the shaft from a neutral intermediate position; two spaced valve-actuating elements extending radially from said shaft and axially movable therewith, a fixed valve body adjacent to the shaft and between said elements, said body having two bores extending thereinto in opposite directions parallel to the axis of the shaft, each said bore having a valve chamber therein, a valve seat in each said chamber, a tubular valve member axially movable in each said bore, each valve member having a balanced intermediate valve element which is normally pressed against the valve seat in the corresponding valve chamber and an end valve element, a plunger axially movable in each said bore, each plunger having an end portion normally projecting from the bore to engage one of said valve actuating elements, the other end of each said plunger being a valve seat engageable by the end valve element of the corresponding valve member, the parts being so arranged that axial movement of the shaft in either direction causes one or the other of said valve actuating members to move its plunger inward to engage said end valve element and to move said valve member to displace the intermediate valve element from its seat.

4. Mechanism as in claim 3, each said valve chamber having an inlet portion and an outlet portion separated by said intermediate valve element, the outlet portion of the two valve chambers being normally in communication with each other through said end valve elements.

5. Mechanism as in claim 3, said valve body surrounding a portion of the steering shaft.

6. Mechanism as in claim 5, said valve-actuating elements being parallel washers secured on said shaft.

FRANCIS W. DAVIS.

References Cited in the file of this patent

UNITED STATES PATENTS

| Number | Name | Date |
|---|---|---|
| 1,719,875 | Cooper | July 9, 1929 |
| 1,830,211 | Roberts | Nov. 3, 1931 |
| 1,850,209 | Knox | Mar. 22, 1932 |
| 1,938,745 | Eaton et al. | Dec. 12, 1933 |
| 2,037,505 | Eaton | Apr. 14, 1936 |
| 2,165,001 | Meyer | July 4, 1939 |
| 2,223,994 | Johnson | Dec. 3, 1940 |
| 2,225,082 | Orshansky, Jr., et al. | Dec. 17, 1940 |
| 2,233,649 | Stahl et al. | Mar. 4, 1941 |
| 2,237,400 | Washburn | Apr. 8, 1941 |
| 2,276,418 | Rockwell | Mar. 17, 1942 |
| 2,361,130 | Simpson | Oct. 24, 1944 |
| 2,406,524 | Ashton et al. | Aug. 27, 1946 |
| 2,478,002 | Mott | Aug. 2, 1949 |